United States Patent [19]

Hines et al.

[11] Patent Number: 5,033,303
[45] Date of Patent: Jul. 23, 1991

[54] TIRE UNBALANCE AUDIT APPARATUS

[75] Inventors: Gordon E. Hines; Vernon J. Burzan, both of Ann Arbor; Leonard J. Salenbien, Saline; Ronald W. Anderson, Ann Arbor, all of Mich.

[73] Assignee: Hines Industries, Inc., Ann Arbor, Mich.

[21] Appl. No.: 430,514

[22] Filed: Nov. 1, 1989

Related U.S. Application Data

[63] Continuation of Ser. No. 153,751, Feb. 8, 1988, abandoned.

[51] Int. Cl.$^5$ ............................................. G01M 1/02
[52] U.S. Cl. ..................................................... 73/485
[58] Field of Search ................ 73/462, 471, 472, 483, 73/484, 485, 487, 474; 157/16, 17

[56] References Cited

U.S. PATENT DOCUMENTS

| | | | |
|---|---|---|---|
| 2,481,125 | 9/1949 | Lannen | 73/485 |
| 2,898,764 | 8/1959 | Kinsey et al. | 73/483 |
| 3,122,021 | 2/1964 | Karig | 73/485 |
| 3,158,032 | 11/1964 | Lannen | 73/485 |
| 3,203,255 | 8/1965 | Rexroat | 73/485 |
| 3,352,732 | 11/1967 | Darr | 73/485 |

Primary Examiner—John E. Chapman
Attorney, Agent, or Firm—Emch, Schaffer, Schaub & Porcello Co.

[57] ABSTRACT

A tire balance audit apparatus with an improved tire support tool is disclosed. The tire support tool utilizes a plurality of jaw members, each driven radially by a ball screw, to engage, center and level an unbalanced tire about the centerline of an unbalance measuring device. The tire is supported solely through engagement of the bead of the tire with the individual jaw members.

2 Claims, 7 Drawing Sheets

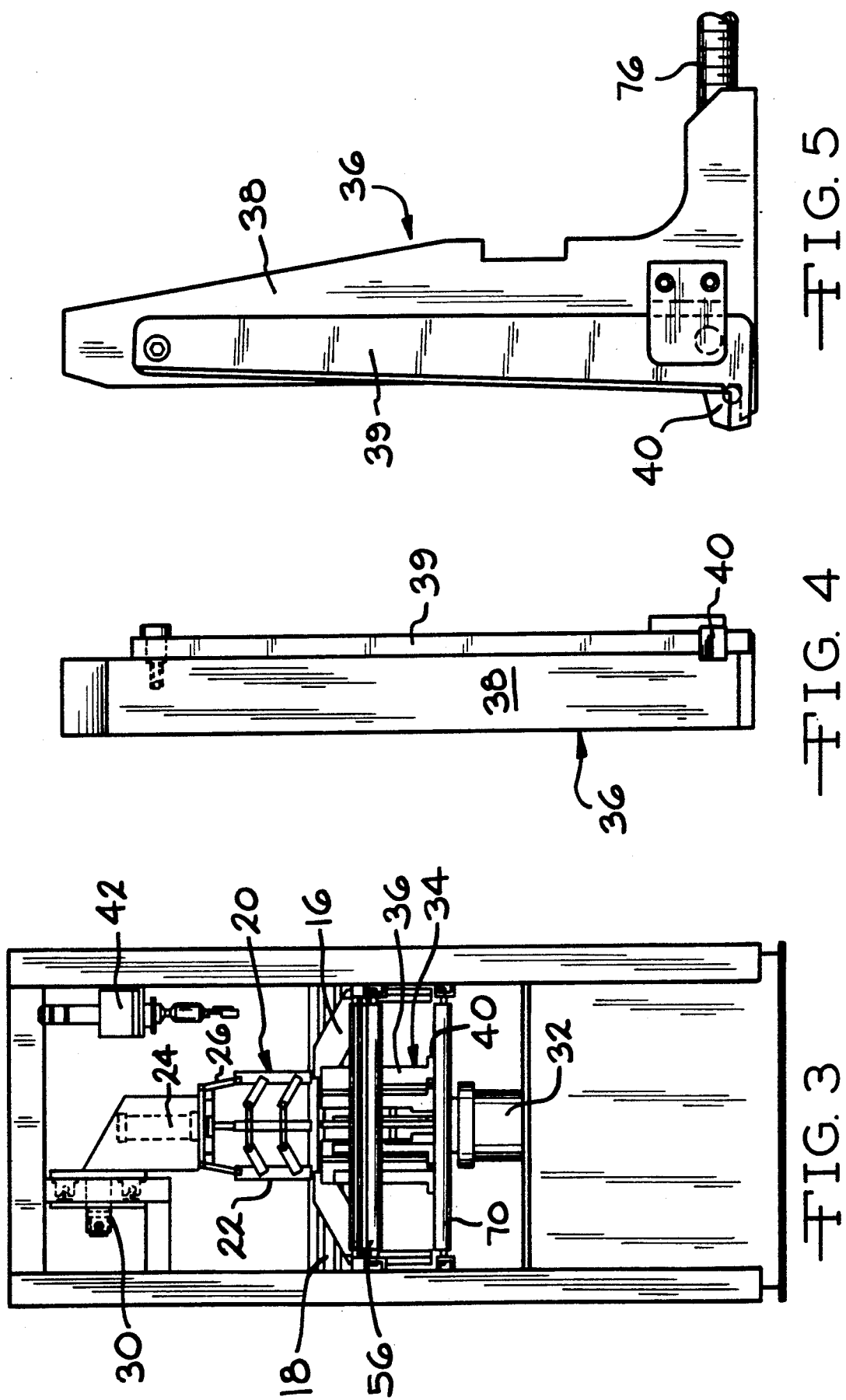

TIRE UNBALANCE AUDIT APPARATUS

This is a continuation of copending application Ser. No. 07/153,751 filed on Feb. 8, 1988, abandoned.

BACKGROUND OF THE INVENTION

The present invention relates an improved unbalance audit machine intended for use in the manufacture of tires. The molding and manufacture of tires having various profiles and sizes is plagued by the inability to accurately and rapidly grade the tires after the completion of manufacture. An important aspect of tire grading involves the determination of the location of any heavy spots or points of unbalance in the newly manufactured tire. If the unbalance is determined to be within preset tolerance standards, the tire is given an appropriate grade and passed through to shipping. If, however, the measured tire unbalance is outside of the preset tolerances, the tire must be scrapped.

Achieving closely accurate unbalance auditing of manufactured tires coming through an assembly line is complicated by the variety of profiles and sizes of tires and, also, the flexibility of the newly manufactured and unmounted tire. Further, differing styles of tires, such as steel belted radial and bias ply tires create varying strength characteristics affecting the support of the tire during unbalance auditing.

Repeatable and accurate unbalance audit operations require precise support and positioning of each incoming tire of the unbalance measuring machine. The centerline of the tire must accurately match the centerline of the unbalance measuring machine and the tire must be maintained in a level position with respect to the centerline of the unbalance measuring machine. These centering and leveling requirements often make the unbalance audit operation time consuming and complex, thus interfering with the quality and efficiency of manufacture.

SUMMARY OF THE INVENTION

The improved unbalance audit apparatus provides an enhanced capability of accurately and rapidly making unbalance measurements of newly manufactured tires in an assembly line setting. The improved audit apparatus of the present invention is fully automated to receive tires from a manufacturing line, perform an unbalance audit on the tire, mark the tire at an appropriate location relative to the presence of a heavy spot of unbalance, and release the tire from the audit apparatus. The audit apparatus of the present invention includes a computerized numerical control system which enables it to adjust to the various profiles and sizes of tires being submitted to the apparatus from the manufacturing line, without need for shutdown of the manufacturing line. The memory of the audit apparatus retains information pertinent to the various profiles and sizes of tires and arranges the tires into classifications. Each classification is statistically averaged on an ongoing basis with respect to the balance points. Thus, for any given class of tire, the memory of the unbalance audit machine predesignates a statistical balance point and the operation of unbalance measuring begins. Such predesignation of a balance point is found to greatly enhance the accuracy of the final unbalance measurement.

The audit apparatus has a feed member which is responsive to signals relating the profile and size of an incoming tire. The feed member properly adjusts to the tire size and provides the incoming tire to a transport member which in turn places the tire on a support member of an unbalance audit machine. The support member orients and centers the tire with respect to the operational axis of the unbalance audit machine while the unbalance audit machine performs the audit operation. Upon the location of a heavy spot or point of unbalance, the tire is marked and released to the grading center. During the audit operation, an new incoming tire is received by the feed member and placed on the transport member. Thus, upon release of the audited tire to the grading center, the transport member supplies the new second incoming tire to the support member to begin the cycle anew.

BRIEF DESCRIPTION OF THE DRAWINGS

FIG. 3 is an end elevational view of the unbalance audit apparatus of the present invention.

FIG. 4 is an end view of a jaw member of the tire support tool of the present invention.

FIG. 5 is a side view of the jaw member of FIG. 4.

DETAILED DESCRIPTION OF THE PREFERRED EMBODIMENT

Figure 1:
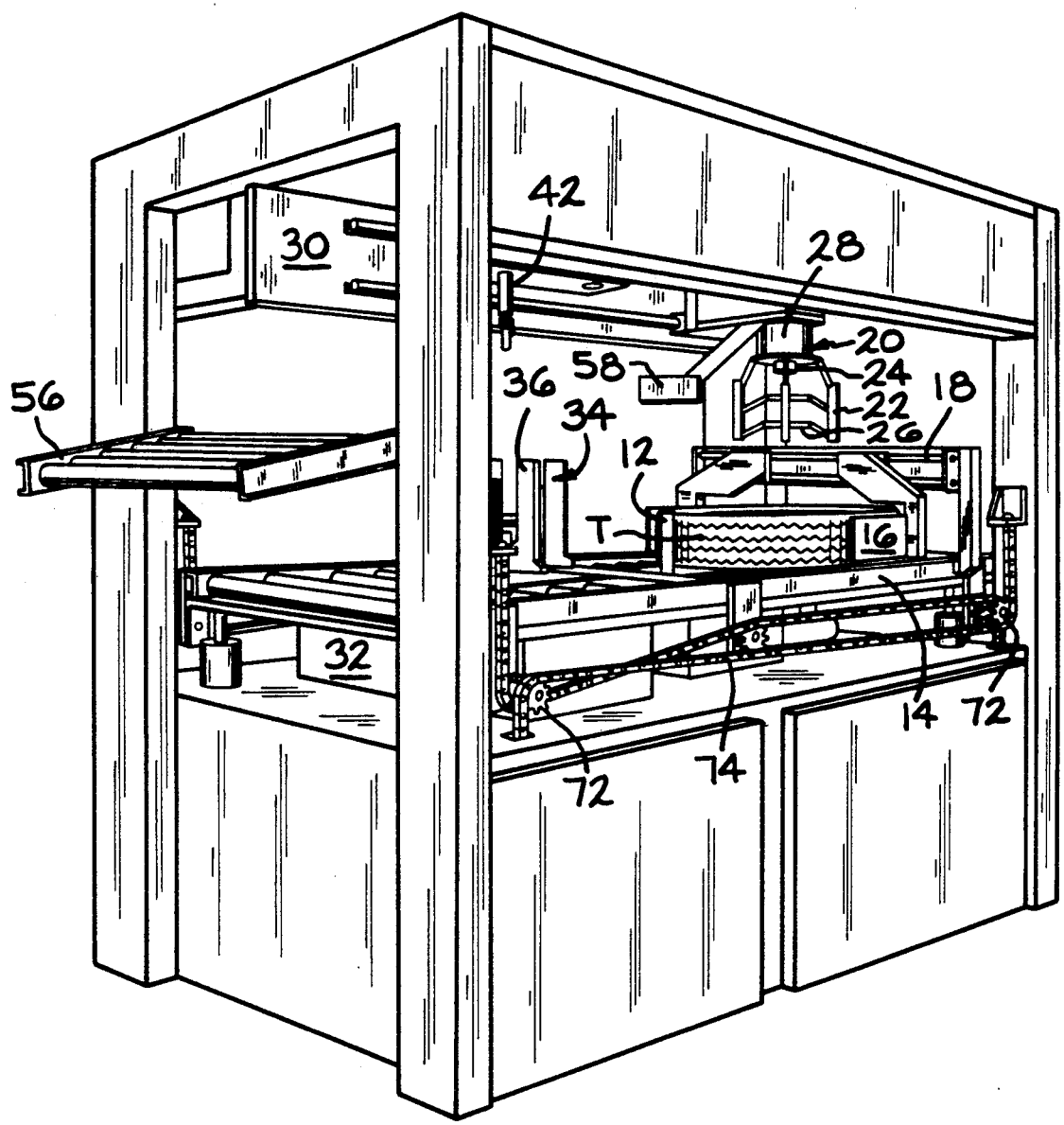
FIG. 1 is a perspective view of the unbalance audit apparatus of the present invention.
Figure 2:
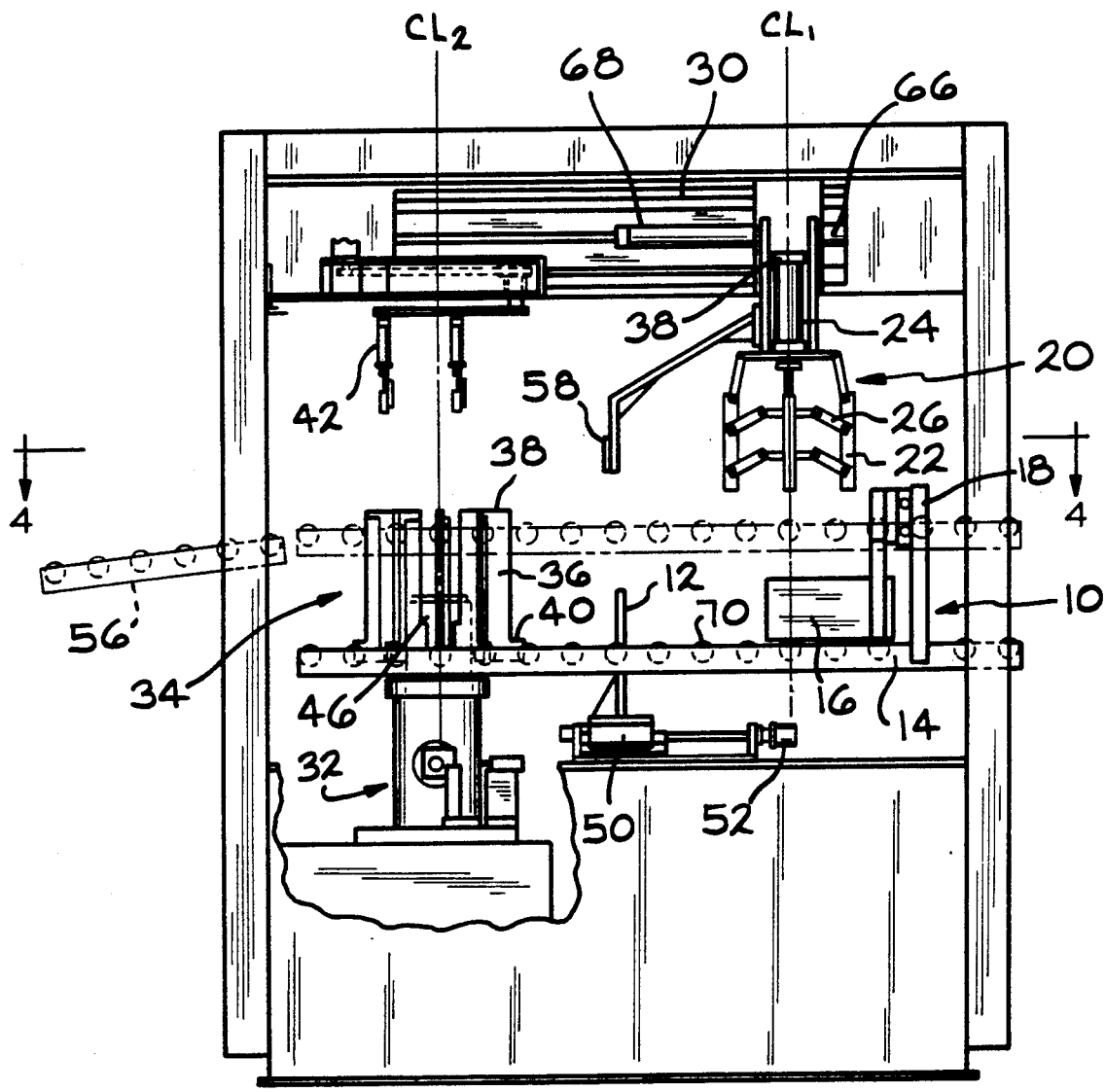
FIG. 2 is a front elevational view of the unbalance audit apparatus of the present invention.
Figure 6:
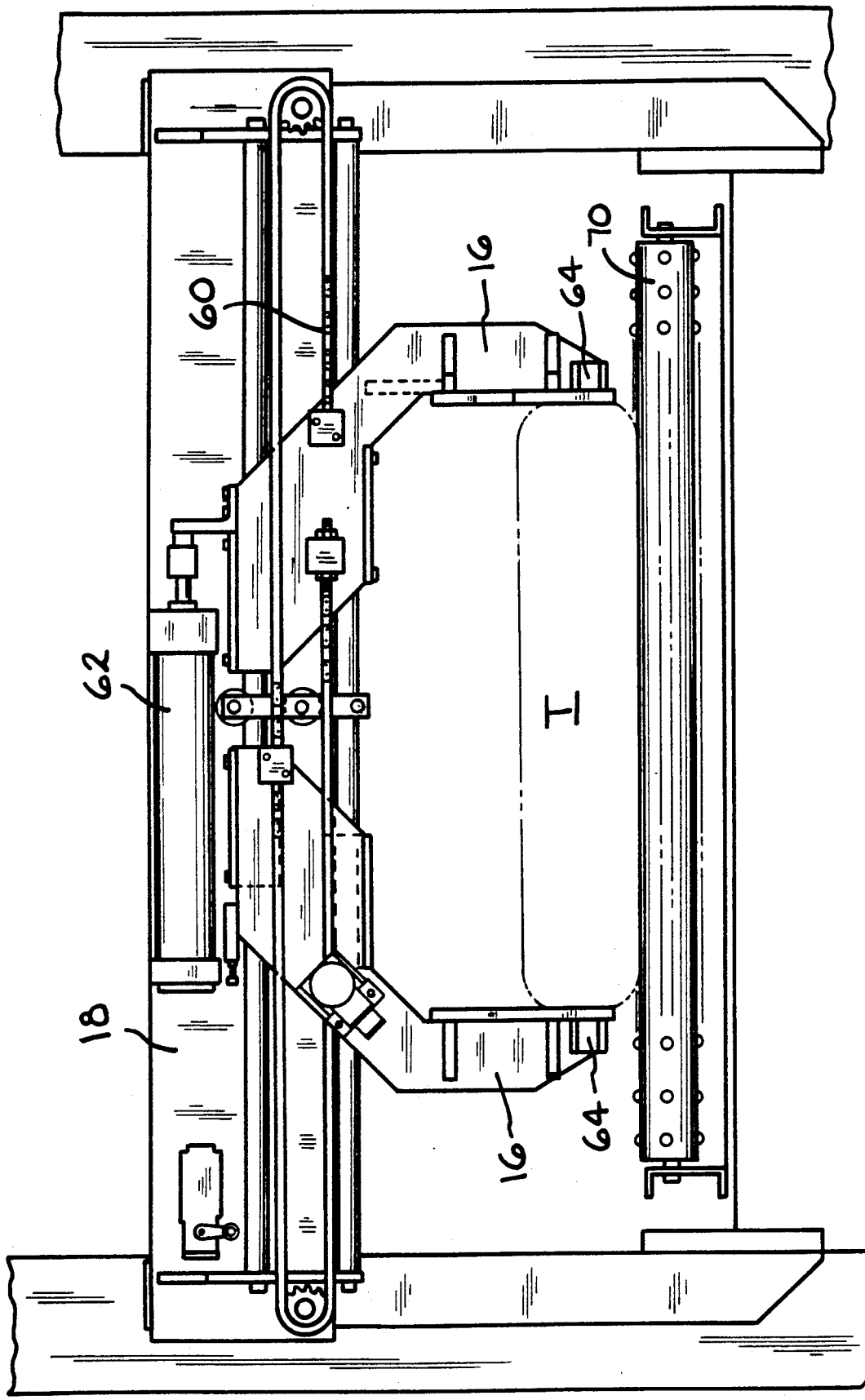
FIG. 6 is a detailed view of the paddle member centering unit of the present invention.
Figure 7:
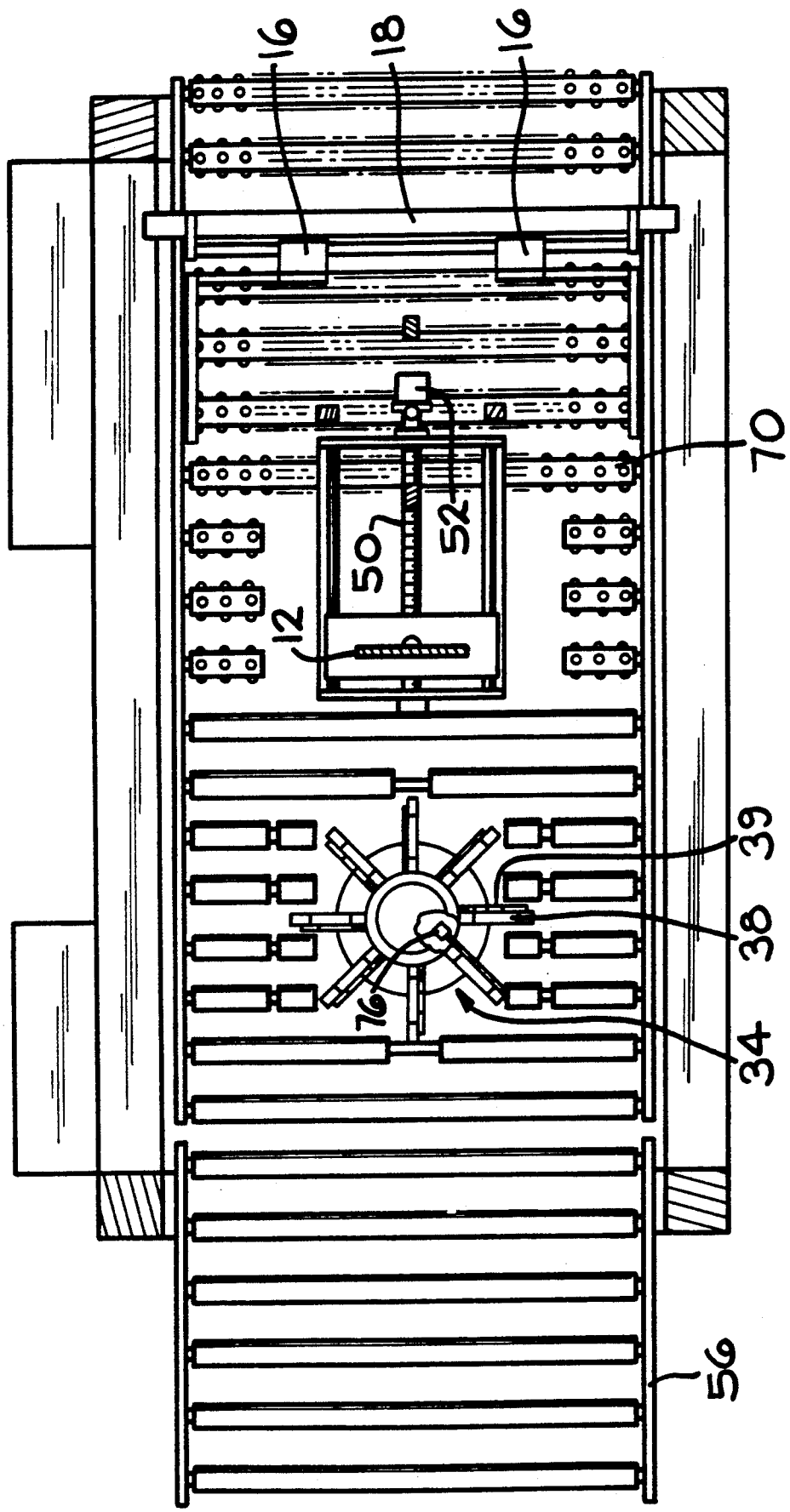
FIG. 7 is a top view of the unbalance audit apparatus of the present invention.

The audit apparatus includes a tire feed member 10, having a designated centerline CL1, which receives tires T from a manufacturing line (not shown). The feed member 10 includes a stop member 12 positioned to curb a tire T moving into the audit apparatus on the conveyor member 14. The stop member 12 is moveable with respect to the designated centerline CL1 of the tire feed member 10 and is powered through a ball screw 50, driven by motor 52. The controller (not shown) receives information pertaining to the incoming tire from the manufacturing line and signals the stop member 12 to automatically move with respect to the designated centerline CL1. A specified relative distance between the stop member 12 and the centerline CL1 is provided whereby the incoming tire T, upon reaching the stop member 12, will be positioned so that the tire centerline is aligned in one plane with the designated centerline CL1.

A pair of opposed paddle members 16 are positioned on opposed sides of the designated centerline CL1. Preferrably, the opposed paddle members 16 are oriented 90° from the stop member 12 about the centerline CL1. The paddle members 16 are mounted for movement on a slide 18 and are each driven inward toward and outward from the centerline CL1 in equidistant amounts by a chain 60 and air motor 62 drive system. When a tire T has reached the stop member 12, the motors 62 are actuated to drive the opposed paddle members 16 toward the designated centerline CL1 in equidistant amounts until both paddle members 16 are in contact with the tire T. In the preferred embodiments, sensors 64 are used to determine the point at which both paddle members 16 are in contact with the tire. A second embodiment envisions the replacement of the air motor 62 with a servo drive controller (not shown) which would discontinue driving the paddle members 16 toward the centerline CL1 upon sensing of the tire T exerting a force against both paddles 16. The programmed movement of the stop member 12 and opposed paddle members 16 to make contact with the incoming tire T about two planes operates to accurately align the centerline of the tire with the centerline CL1 of the feed member 10.

Positioned about the same designated centerline CL1 above the feed member 10 is a transport member 20. The transport member 20 includes at least three and preferrably six to eight transport finger members 22 equidistantly disposed around the designated centerline CL1. A piston member 24 is positioned on the centerline CL1 and is operated to move axially on the centerline CL1 by a drive motor 28. The finger members 22 are interconnected with the piston member 24 through a series of interjoined levers 26. As the piston 24 moves, the levers 26 are actuated thereby causing the finger members 22 to extend and retract radially with respect to the designated centerline CL1. A sensor (not shown) determines the point at which the finger members 22 are engaged with the tire T. A linear encoder (not shown) is used in the preferred embodiment to determine the radial distance traveled by the finger members 22 and identify the inside diameter. This information can be used to verify the determined inside diameter with the data received from the assembly line.

The transport member 20 is positioned on a transport slide 30. The slide 30 extends between a first position proximate the centerline CL1 of the tire feed member 10 and a second position located proximate the centerline CL2 of an unbalance measuring machine 32. An air actuated motor 66 drives a ball screw 68 to move the transport member 20 on the slide 30 between positions. Limit switches (not shown) are positioned proximate the slide 30 to engage and stop movement of the transport member 20 and to orient the centerline of the transport member with the centerlines of either the unbalance measuring machine CL2 or the tire feed member CL1.

The conveyer member 14 is comprised of a rack of freely rotating rollers 70 mounted in a vertical track 44. A sprocket 72 and chain 74 drive is used to move the conveyer member 14 between a first position for receiving and centering the incoming tire T and a second position wherein the tire T is engaged by the fingers 22 of the transport member 20. The preferred embodiment of the invention incorporates rollers 70 capable of providing movement of the tire in a transverse as well as longitudinal direction.

Figure 8:
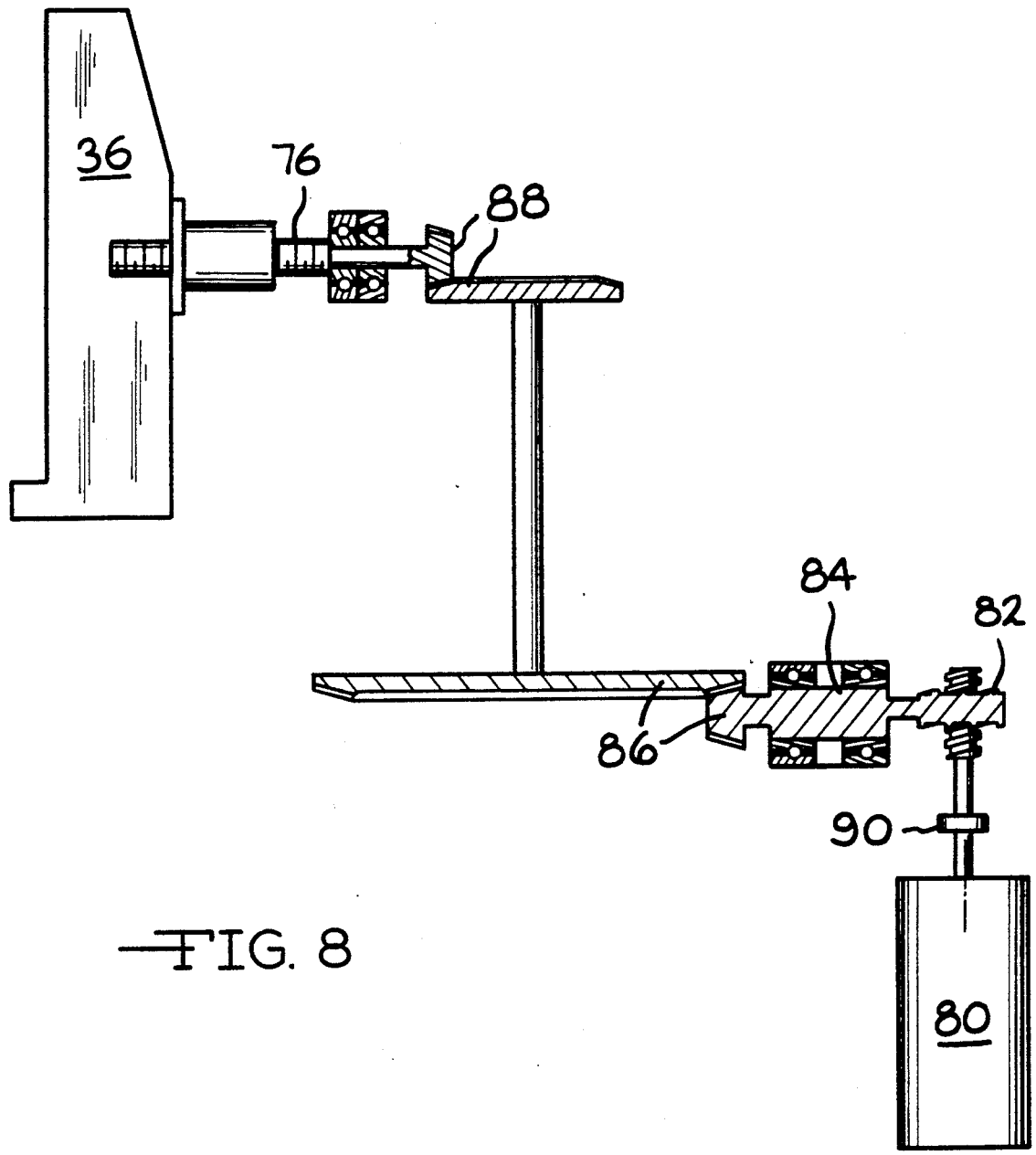
FIG. 8 is a schematic view of the drive gearing for the tire support member of the present invention.

The unbalance measuring machine 32 includes a tire support member 34 having, in the preferred embodiment, eight radially moving jaw members 36. The radially moving jaw members 36 are each driven by a ball screw 76 to expand and retract about the centerline CL2 of the unbalance measuring machine 32. Referring now to FIG. 8, the ball screws 76 receive their drive from a servo motor 80 through a helical gears 82, a "no back" bearing 84, and lower and upper bevel gear 86, 88. The individual ball screws are all driven from the upper bevel gear 88. The "no back" bearing 84 enhances the accuracy of the radial movement of the jaw members 36 with respect to the centerline CL2 by preventing any unwanted rotation or movement of the bevel gear 86, 88 during disconnection of the servo motor 80 from the gearing 82, 86, 88.

Figure 9A:
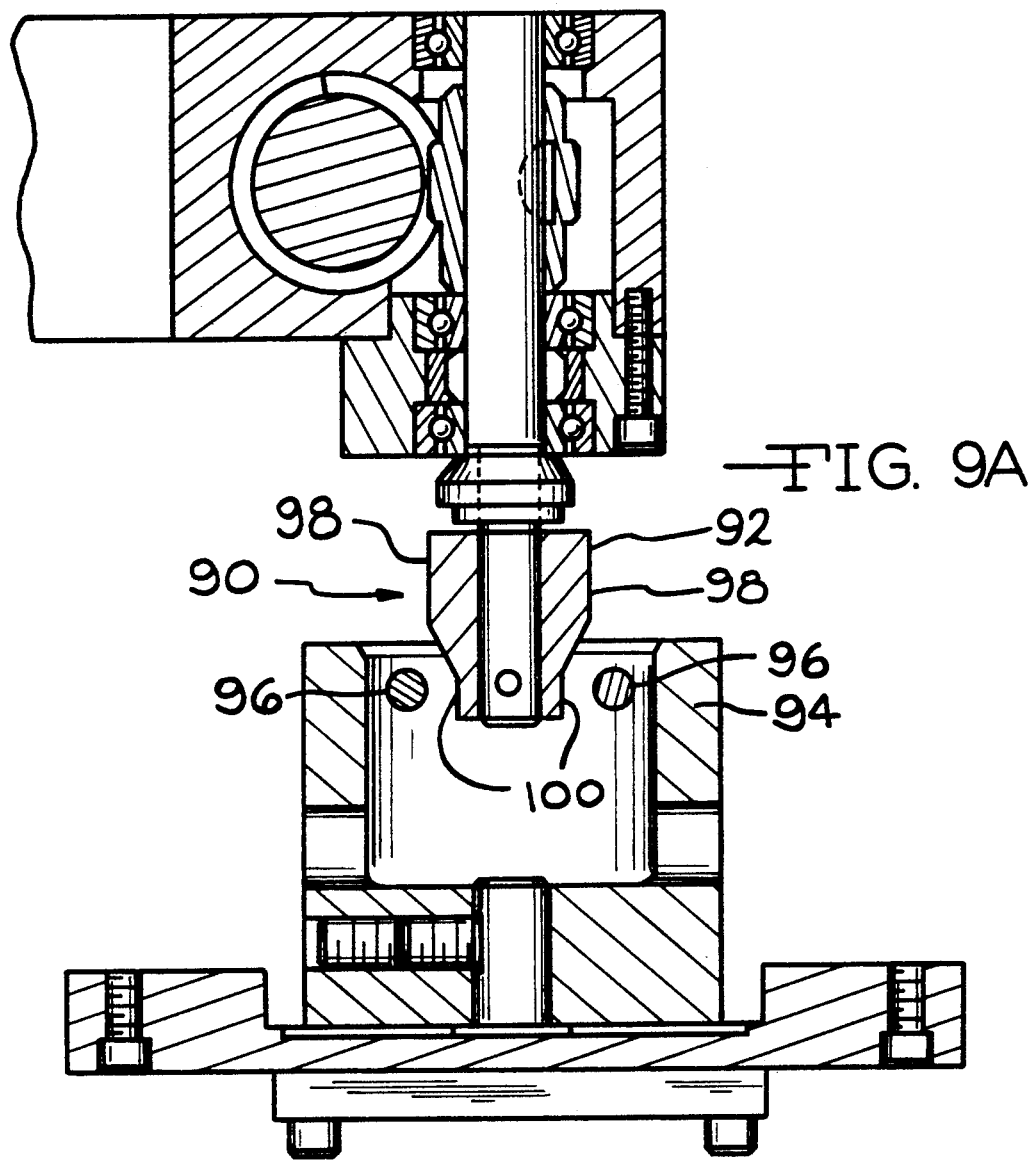
FIGS. 9A and 9B are a detailed view of the coupler member 90 of FIG. 8.
Figure 9B:
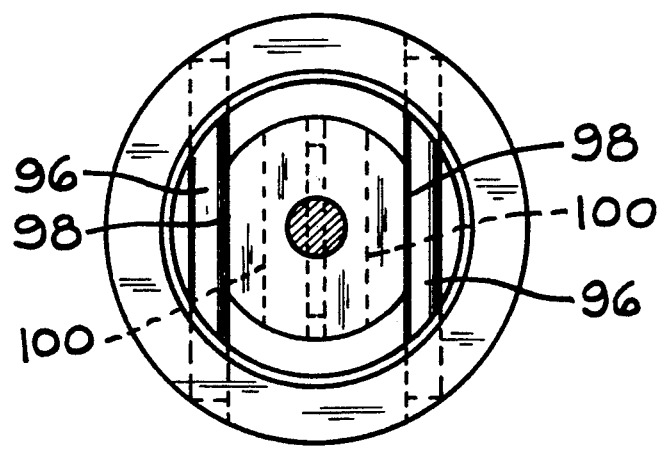

The servo motor 80 is connected to the helical gears 82 by a coupler 90. Referring to FIGS. 9A and 9B, the coupler 90 is shown in a disengaged position. The couplier 90 consists of a male member 92 and a female member 94. Within the female member 94 are two engagement pins 96 designed to engage the surface 98 of the male member 92 when the coupler 90 is in the engaged position. The engagement pins 96 will also act to engage the indented surface 100 of the male member 92 when the coupler 90 is in the disengaged position if the female member 94 and male member 92 attempt to rotate with respect to each other. This disengaged engagement between the engagement pins 96 and indented surface 100 prevents any unwanted rotation of the gearing 82, 86, 88 when the servo motor 80 is uncoupled. The coupler 90 is used in the present invention to physically disconnect the servo motor 80 from the gearing 82, 86, 88 thereby allowing the support member 34 with tire T to rest solely on the unbalance measuring machine 32 during the audit operation.

Each jaw member 36 of the support member 34 includes a vertically extending finger 38 with an arm member 39 mounted on said finger to pivot radially outward from the centerline CL2. A spring 41 is positioned between the arm member 39 and the finger 38 and acts to maintain the arm member in a position slightly outside the radius of the finger 38. The arm member 39 includes a bead engagement surface 40 designed to engage and support the tire T by its interior rim or bead. The spring 41 positioned arm member 39 provides an increasing radial surface which engages the tire T gradually as the tire T is lowered onto the support member 39. This prevents unwanted distortion of the tire bead or wall during loading and helps maintain the tire T in a level orientation with respect to the centerline CL2 of the unbalance measuring machine 32. The eight fingered jaw members act to support a tire T in a level and centered orientation with respect to the centerline CL2.

The tire support member 34 is positioned on a lift member 46. The lift member 46 is piston-driven (not shown). The lift member 46 maintains the tire support member 34 in a disengaged position with respect to the unbalance measuring device 32, when the tire support member 34 is receiving or discharging a tire T. This disengagement prevents damage to the unbalance machine during tire loading operations. After the tire T is completely engaged by the tire support member 34, the lift member 46 lowers the tire support member 34 onto the unbalance measuring machine 32 and disengages the support member 34. The motion by the left member 46 also serves to provide the engagement and disengagement action of the coupler 90. The unbalance measuring machine 32, solely supporting the tire T and support member 34 without engagement by the left member 46 or servo motor 80, then performs the unbalance audit. Upon completion of the audit, the lift member 46 is activated to engage the tire support member 34 and disengage the tire support member 34 from the unbalance measuring machine 32.

Located directly above the support member 34 is a marking device 42. The marking device includes a marker 48 and an arm member 54 attached to a pivot point and supporting the marker 48. The arm member can articulate and adjust to access the perimeter of a tire T at any location to mark a determined heavy spot or point of unbalance. The arm member 54 is powered, preferably by a servo motor (not shown) which receives signals from the unbalance measuring machine 32 designating a point of unbalance for a given tire T. The motor, in response to the signal, powers the arm member 54 to locate the marker 48 relative to the signals from the unbalance measuring machine 32.

A release conveyer 56 is located adjacent the end of the conveyer member 14 when the conveyer member 14 has been lifted into its second position. A release tool 58 is fixed to the transport member 20. The release tool 58 is positioned to engage a tire T, after marking, at the completion of the unbalance measurement cycle. The release tool 58 engages the audited tire T and pushes the tire T down the release conveyer 56 as the transport member 20 carries a new tire to the unbalance measuring machine 32 to begin the unbalance measurement cycle anew.

The sequence of operation of the present invention is as follows. The preferred embodiment is intended for use in an automated tire manufacturing line controlled by microprocessors. A manufacturing line controller provides information to the controller (not shown) of the audit apparatus, relating the profile and size of an incoming tire T. The stop member 12 is automatically moved by its ball screw 50 and motor 52 to a specified position with respect to the designated centerline CL1 of the feed member 10. Once in position, the stop member 12 assures proper alignment of the centerline of the incoming tire T with the designated centerline CL1 on at least one plane. The incoming tire T, moves onto the conveyer member 14 while the conveyer member 14 is resting in its first or down position. Upon arrival of the tire T on the conveyer member 14 against the stop member 12, the paddle members 16 are actuated by their chain 60 and motor 62 drive unit to move on their slide 18 toward the designated centerline CL1 until both paddle members 16 make contact with the tire T. Since the paddle members 16 are controlled to move equidistant amounts with respect to the designated centerline CL1 it is ensured that when both sensors 64 of the paddle members 16 show contact with the tire T, the centerline of the tire is centered in two planes with the designated centerline CL1 of the feed member 10. After the paddle members 16 and stop member 12 have centered the tire with respect to the designated centerline CL1, the paddle members are retracted by their chain 60 and motor 62 drive unit and disengage the tire T, leaving it centered with respect to the designated center line CL1.

After disengagement by the paddle members 16, the conveyor member 14, sprocket 72 and chain 74 drive unit is actuated to raise the conveyer 14 on the track 44 to its second position. As the conveyor 14 lifts to the second position, the tire T is moved vertically along the designated centerline CL1 into proximity with the finger members 22 of the transport member 20. The piston 24 is actuated by the motor 28 to drive the lever members 26 and finger members 22 into a small diameter configuration so that the transport member 20 inserts through the center opening of the tire T as the tire T is lifted by the conveyor member 14. Once the conveyor member 14 reaches its second position and the transport member 20 is inserted through the center hole of the tire T, the piston 24 is activated to extend the levers 26 and finger members 22 radially outward to engage the interior rim of the tire T. The finger members 22 continue their extension radially outward until they sense contact with the inside bead of the tire T. In an alternative embodiment, the piston 24 is designed to continue pressing the finger members outward until a resistance is met in the tire T that exerts enough force to back up the air pressure in the piston 24 cylinder.

Once the transport member 20 is firmly engaged with the tire T, the slide member 30 motor 66 and ball screw 68 drive unit is activated to move the transport member 20 from orientation over the tire feed member 10 to orientation over the centerline CL2 of the unbalance measuring machine 32. The conveyer member 14 remains raised to its second position during the transfer operation. As the transport member 20 is moved along the slide member 30, it trips a limit switch (not shown) which completes the motion and properly centers the tire T over the unbalance measuring machine 32. Once the tire T is oriented over the unbalance measuring machine 32, the piston 24 of the transport member 20 is activated to retract the finger members 22 radially from engagement with the tire T, leaving the tire T supported by the conveyer member 14.

The conveyor member 14 supporting the tire T, is lowered to return to its first position. Through the downward travel, the tire T is placed over the jaw members 36 of the tire support member 34 of the unbalance measuring machine 32. The support member 34 is disengaged from the unbalance measuring machine 32 and supported entirely by the lift member 46 while receiving the tire T. The jaw members 36 are presized according to the information relating to the incoming tire T received from the manufacturing line processor to be positioned having an outside diameter slightly less than the inside diameter of the tire T. As the tire is lowered onto the support member 34 by the downwardly moving conveyer member 14, the interior diameter bead of the tire T engages the spring loaded arm member 39 and comes to rest on the bead engagement surface 40. The jaw fingers 38 are then radially expanded by the individual ball screws 76 to a precalculated diameter designed to engage the tire T with the vertical finger 38 while the tire T is resting on the bead engagement surface 40. The tire is thus leveled with respect to the axis of the unbalance measuring machine 32 and centered with respect to the axis of the unbalance measuring machine 32. The tire T is supported entirely by the support member 34. At the same time, the transport member 20 has returned to its first position relative to the designated centerline CL1 of the feed member 10 and the conveyer member 14 has returned to its first position.

The support member 34 is separated from the unbalance measuring machine 32 by the tooling lift 46 to prevent damage to the sensitive components of the unbalance measuring machine 32 during loading and unloading of the tires T. After the tire T is placed onto the support member 34, the tooling lift 46 is activated to lower the support member 34 into engagement with the unbalance measuring machine 32 and then it disengages from the support member 34. When the support member 34 and tire are solely supported by the unbalance measuring machine 32 the balance cycle begins to measure the location and amount of any unbalance in the tire T. Upon completion of the unbalance cycle, the tooling lift is activated to raise the support member 34 out of engagement with the unbalance measuring machine 32. The jaw members 36 of the support member 34 retract slightly to disengage the vertical fingers 38 from the interior of the tire T while the tire remains resting on the bead engagement surface 40 of the arm members 39.

During the unbalance measuring operation, a new tire is being placed on the conveyer member 14 in orientation with the designated centerline CL1. As the conveyer 14 begins to rise to its second position, the new tire is placed proximate the transport member 20 and the original tire T is entirely removed from the support member 34. The marker member 48 moves to the designated location of unbalance on the tire T and provides a marking relative to the location of unbalance. While the marking member 48 provides the mark on the tire T, the finger members 22 of the transport member 20 engage the new tire received from the feed member 10. The transport member 20 begins to move the newly arrived tire toward the centerline of the unbalance measuring machine CL2. As the transport member 20 moves, the release tool 58 fixed to the transport member pushes the marked tire T down the release conveyor 56.

The above description of the preferred embodiment is intended for illustrative purposes. It is anticipated that alternative embodiments may be employed to the same end without departing from the scope and content of the following claims.

We claim:

1. A tire unbalance audit apparatus comprising, in combination:

an unbalance measuring device having a tire support tool;

said tire support tool including a plurality of jaw members disposed in equidistant radial amounts around the axial centerline of said unbalance measuring device, said jaw members each including a finger member for engaging such tire and an arm member positioned on each of said finger members to pivot radially outwardly, with respect to the centerline of said unbalance measuring device, from said finger member and a spring member engaging each of said finger members and their respective arm members to bias each of said arm members radially outward from its respective finger member, each arm member including a bead support surface for engaging the bead of a tire being placed onto said workpiece support tool and supporting such tire thereby;

drive means for moving said individual jaw members solely in a radial direction in equidistant amounts about such centerline to preposition said bead support surface to a radial position slightly larger than the radial position of said finger member with respect to the centerline of said unbalance measuring device when said tire support tool is unloaded, whereby upon loading of a tire, the bead of such tire engages said bead support surfaces of said arm members and said finger members are then radially moved by said drive means to close upon said arm members and stablize the tire in a centered and leveled orientation with respect to the centerline of said unbalance measuring device; and means for disengaging said tire support tool from said unbalance measuring device during tire loading and unloading.

2. The audit apparatus of claim 1 wherein said drive means prepositions said jaw members so that said finger members define a radius slightly less than the inner radius of an incoming tire and said arm members are first engaged by said tire as said tire is placed onto said tire support apparatus.

* * * * *